United States Patent [19]

Szentmihaly

[11] 4,106,526
[45] Aug. 15, 1978

[54] HIGH TEMPERATURE END FITTING

[75] Inventor: Charles Szentmihaly, Salisbury, England

[73] Assignee: BTR Industries Limited, London, England

[21] Appl. No.: 784,910

[22] Filed: Apr. 5, 1977

[30] Foreign Application Priority Data

Apr. 8, 1976 [GB] United Kingdom ............... 14375/76

[51] Int. Cl.² .................... F16L 11/08; F16L 33/20
[52] U.S. Cl. .................................. 138/109; 285/256; 285/259
[58] Field of Search ................ 138/109; 285/256, 259

[56] References Cited

U.S. PATENT DOCUMENTS

| 1,825,005 | 9/1931 | Loughead | 285/256 X |
| 2,374,225 | 4/1945 | Melsom | 285/256 X |
| 2,479,499 | 8/1949 | Le Clair | 285/256 |
| 2,661,225 | 12/1953 | Lyon | 285/256 X |
| 3,073,628 | 1/1963 | Cline et al. | 285/259 X |
| 3,347,571 | 10/1967 | New | 285/256 X |

FOREIGN PATENT DOCUMENTS

| 405,672 | 10/1970 | Australia | 138/109 |
| 69,012 | 9/1969 | Fed. Rep. of Germany | 138/109 |
| 655,741 | 8/1951 | United Kingdom | 285/256 |

*Primary Examiner*—Richard E. Aegerter
*Assistant Examiner*—James E. Bryant, III
*Attorney, Agent, or Firm*—Watson, Cole, Grindle & Watson

[57] ABSTRACT

A hose end unit comprises a reinforced hose end portion having at least an inner cylindrical elastomeric liner and a reinforcement layer and an end fitting being of the kind comprising an insert to enter into the end portion of the hose and a ferrule to surround the end portion of the hose. A plurality of radially inward projections are provided on the ferrule and the ferrule is swaged around the insert so that the hose end portion is gripped between the insert and the ferrule by the projections. The extrusion gap, as herein defined, is sufficiently narrow to substantially prevent flow of the elastomeric liner in the axial direction in use. Furthermore, the space between the ferrule and the insert in between two extrusion gaps is completely filled and the elastomer is compressed into cells delimited by the extrusion gap.

8 Claims, 9 Drawing Figures

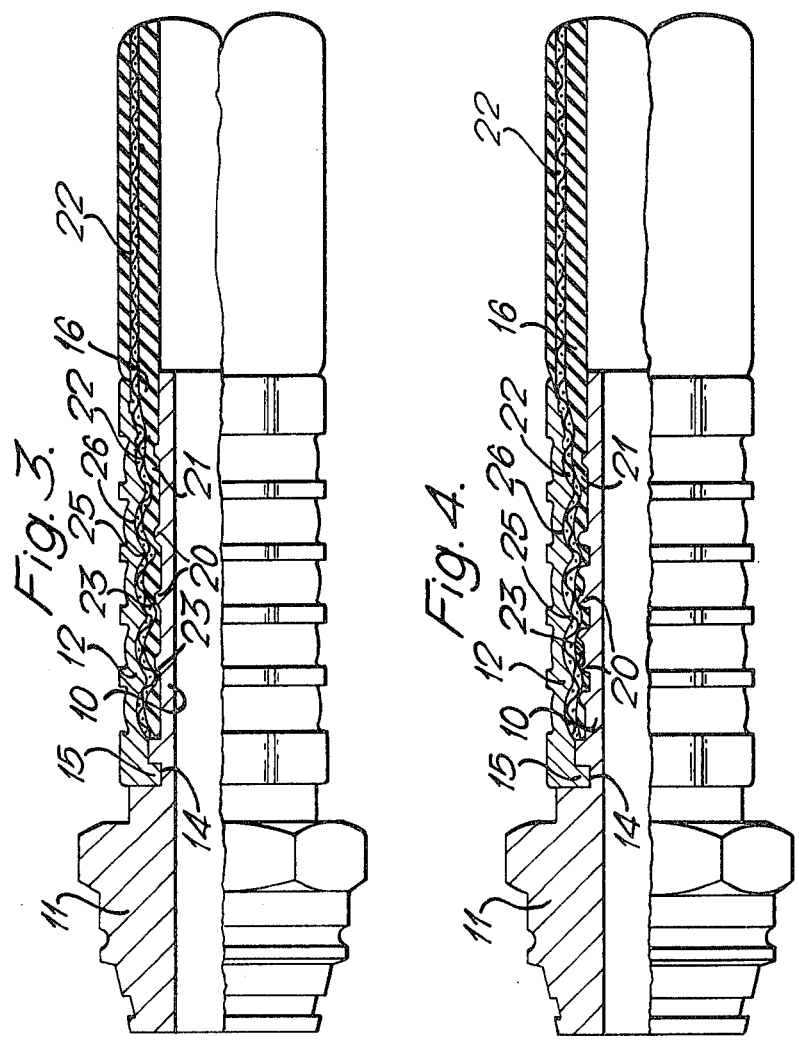

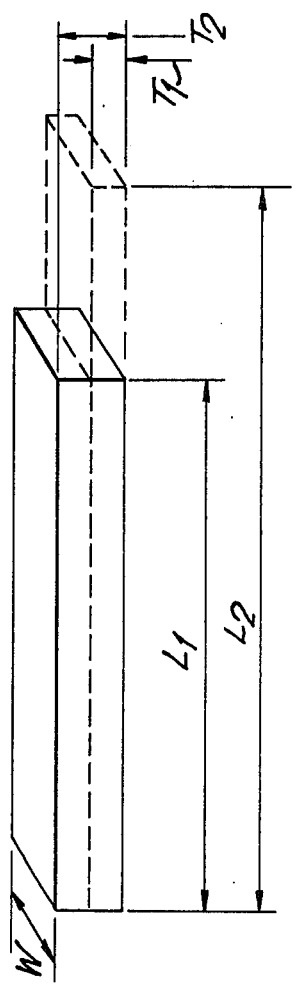
Fig. 6.
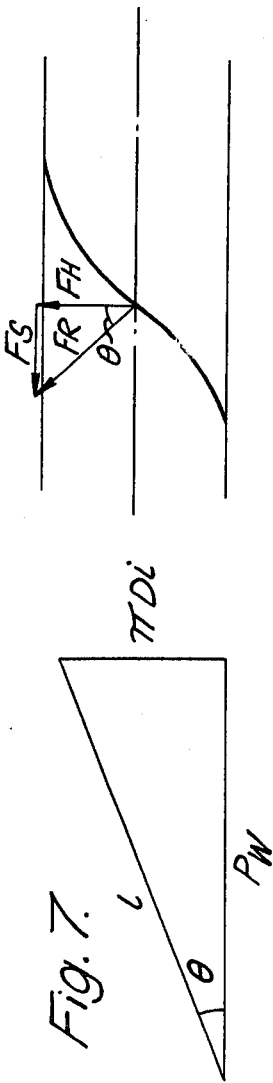
Fig. 8.
Fig. 7.

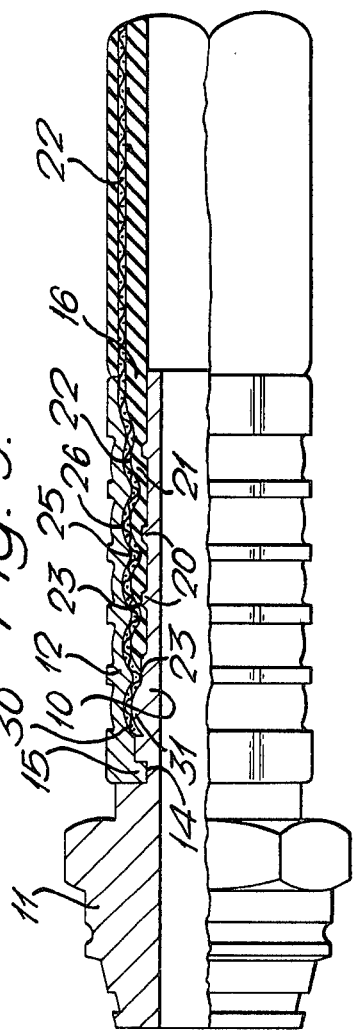

HIGH TEMPERATURE END FITTING

BACKGROUND OF THE INVENTION

FIELD OF THE INVENTION AND PRIOR ART

The invention relates to hose end units and more particularly relates to a hose end unit comprising a hose end portion having at least an inner cylindrical elastomeric liner, for example rubber, and a reinforcement layer surrounding the liner, and an end fitting of the kind comprising an insert which enters into the end portion of the hose and a ferrule which surrounds the end portion of the hose, a plurality of projections being provided on the ferrule, the ferrule being swaged around the insert so that the hose end portion is gripped between the insert and the ferrule by the projections. The hose end portion may have an outer cover or the outer cover may be removed. Such an end unit will hereinafter be referred to as "of the kind described". In end units of the kind described, the gap between the wire reinforcement and the peak of a projection on the insert is referred to as "the extrusion gap" since it is through this gap that the rubber layer tends to extrude when the hose is subjected to internal pressure due to the separation force induced inside the end fitting resulting from the above mentioned internal pressure, since the initial pressure in the rubber will decay to zero due to volumetric displacement of the liner in the axial direction. This phenomenon can lead to failure of the end fitting and, in known compression end fittings, it is found that the fitting will separate from the hose at lower than the burst pressure of the hose.

SUMMARY OF THE INVENTION

The present invention provides a hose end unit of the kind described in which the extrusion gap as defined above is sufficiently narrow to substantially prevent extrusion of the elastomeric liner in the axial direction in use and wherein the space between the ferrule and the insert in between two extrusion gaps is completely filled and the elastomer is compressed into cells delimited by the extrusion gaps.

The extrusion gap is preferably less than 1.5 millimeters.

Preferably there are projections on both the ferrule and the insert and the projections on the ferrule are offset from those on the insert in the longitudinal direction of the hose. In this case, the projections on the insert are provided to achieve the minimum extrusion gap. If the liner is sufficiently thin, the projection on the insert may be unnecessary and may be dispensed with.

Preferably the projections on the ferrule comprise annular abutments which define annular depressions therebetween, the depressions and projections being so shaped that a first diameter to which the rubber liner is strained in the depressions is relatively large compared to a second diameter at which a separating force induced by the pressure in the hose acts, the difference between said first and said second diameters being at least 10% of the internal diameter of the hose.

Preferably the ferrule is shaped in longitudinal cross-section such that the parts of the ferrule defining the depressions are parabolic.

Preferably a point of inflection is formed on each side of each projection between the projection and its adjacent depressions and the angle defined by the tangents at the points of inflection on each side of a projection and the longitudinal axis is between 70° and 90°.

BRIEF DESCRIPTION OF THE DRAWINGS

FIG. 3 is a view, partly in longitudinal section of an end unit according to the present invention;

FIG. 4 is a view similar to FIG. 3 of the end unit showing a modification in which the extrusion gap is completely closed;

FIGS. 6 to 8 are diagrams showing forces and strains in the hose end portion; and FIG. 9 shows a modified end fitting.

DESCRIPTION OF THE PREFERRED EMBODIMENTS

Figure 1:
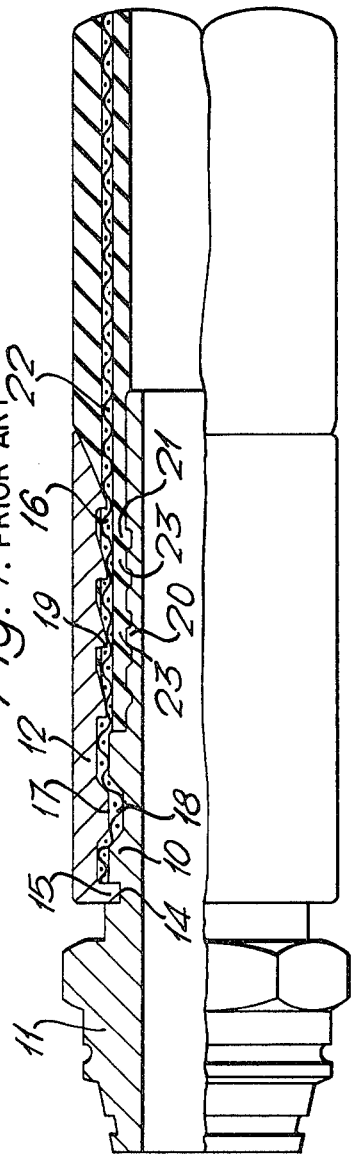
FIG. 1 is a view, partly in longitudinal section of a prior art end unit.
Figure 2:
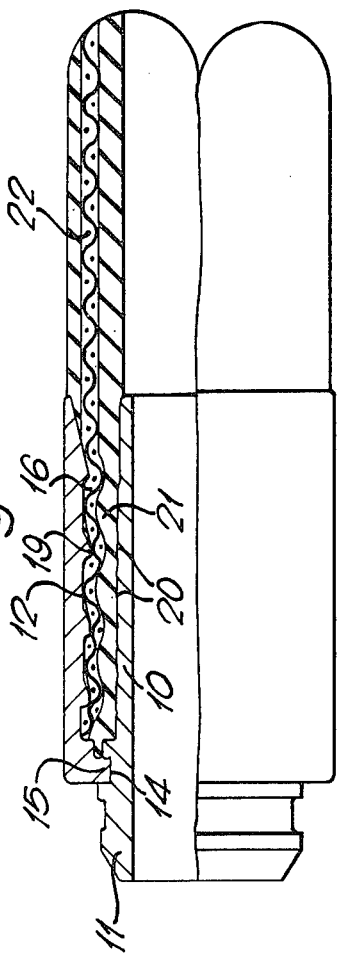
FIG. 2 is a view, partly in longitudinal section, of another prior art end unit.

Referring first of all to FIGS. 1 and 2, it will be seen that an end fitting for a skived hose end portion, i.e. an end portion with the outer cover removed, 16 of a reinforced hose comprises an insert 10 formed integrally with a nipple 11. Surrounding the insert is a ferrule 12 which is swaged around the insert 10.

The insert is provided with an annular groove 14 which received a radially inwardly extending annular abutment 15 on the ferrule. Furthermore, in the case of an interlock type end fitting of the kind shown in FIG. 1, a further annular depression 18 is formed in the insert and receives a corresponding radially inwardly directed annular projection 17 on the ferrule.

In both FIGS. 1 and 2, the ferrule is also provided with radially inwardly extending annular abutments on projections 19 and the insert is provided with radially outwardly extending annular projections 20 to grip the hose end portion 16 therebetween.

Prior art end fittings of the compression type described in relation to FIG. 2 have proved to be unsatisfactory in high temperature and pressure application. At temperatures higher than 70° C, interlock type end fittings of the type shown in FIG. 1 are normally used with high pressure hoses. The problem that arises is that of end-fitting retention since it is found that prior art end fittings of the compression type will separate from the hose at lower than the burst pressure. Normal practice in the art in attempting to overcome this problem is to increase the compression level of the elastomeric liner 21. This can result in liner rupture at higher temperatures. However, it has been established by experimentation that at high temperatures the elastomer will change its physical properties, and the retention level of the end fitting will be affected by this change.

The end fittings of the present invention seek to overcome this problem by utilising the physical properties of the elastomer to improve the end fitting retention. Elastomer is generally considered to be incompressible if it is not allowed to flow. However, when elastomer is pressurised it will tend to flow and extrude outwardly from the area of pressure. In prior art end fittings, the elastomer tends to flow through the "extrusion gap" 23 which is the gap between the wire reinforcement 22 of the hose and the peaks of the projections 20 on the insert. This phenomenon will lead to complete loss of anchorage for the end fitting. Two examples of end fittings according to the invention are shown in FIGS.

3 and 4, in which like parts bear the same reference numerals as in FIGS. 1 and 2.

Referring now to FIGS. 3 and 4, it will be seen that the annular projections 19 of the prior art end fittings are replaced by radially inwardly extending abutments 25 separated by depressions 26. The height of the peaks of the abutments 25 relative to the depressions 26 is very much greater than that of the projections 19. Furthermore the abutments 25 are arranged slightly offset from the projections 20 on the insert, so that the size of the extrusion gap is reduced to a very small figure, preferably less than sixty thousandths of an inch. In fact, in the example shown in FIG. 4, the projections 20 are so shaped that the extrusion gap is zero.

Some theoretical explanation of the reasons for this reshaping of the abutments 25 on the ferrule will now be given with particular reference to FIG. 5, which shows an enlarged sectional view of the end fitting of FIG. 3 after swaging, that is, after the reinforcement 22 and elastomeric liner 21 have been deformed anchoring the end fitting to the hose.

The swaging operation will cause radial movement of the ferrule and the teeth of the ferrule will bite into the wires forcing the wires to deflect in a parabolic form. This radial movement will displace the elastomer axially such that the cavity in the ferrule will be filled provided the groove depth and pitch is related to the physical dimensions of the particular hose in question.

The inside form of the ferrule is parabolic to follow the natural deflection of the reinforcement and the elastomer during the swaging operation and to ensure a complete fill of the ferrule after swaging, thereby avoiding destruction of the insulation between each layer of the reinforcement. In conventional end fittings the inside form of the ferrule does not follow to the normal deflection of the rubber and reinforcement of the hose and, as a result, the physical strength of the insulation is partially destroyed in the swaging operation, mainly in the first layer of the insulation. The deflection of the reinforcement of the rubber does not normally achieve complete fill and therefore the extrusion pressure as expressed in equation (1) below can only be realised after a relatively large axial movement of the end fitting, when the hydrostatic pressure is applied to the end fitting. This movement, which in practical terms may be very small, will increase the strain level of the rubber and the elastomeric liner of the hose, which will lead to early failure of the hose assembly in question.

In the end fittings shown in FIGS. 3 and 4, the elastomer is displaced such that after swaging it is enclosed in small cells 28 with the minimum practicable extrusion gap 23. In certain cases such as shown in FIG. 4, the extrusion gap may be completely closed after swaging has been achieved, but this will depend on the particular design of insert.

It is a known fact that when the hose is pressurised hydraulically there will be a separating force 'FS' acting on the ferrule trying to blow off the end fitting. This force when transmitted through the reinforcement will generate a hydrostatic pressure in the elastomer and has a tendency to extrude the rubber from each cell. The magnitude of the extrusion pressure 'Pe' is proportional to:

$$Pe = \frac{F_s}{(D_2^2 - D_1^2)\frac{\pi}{4}} \qquad 1$$

$$F_s \propto \frac{D_1^2 P_s \pi}{4} \qquad 2$$

$$\therefore Pe \propto \frac{D_1^2 P_s}{D_2^2 - D_1^2} \qquad 3$$

Where
$F_s$ = Separating force
$Pe$ = extrusion pressure
$D_1$ = the diameter at which the separating force is acting
$D_2$ = the diameter to which the rubber liner is strained
$P_s$ = Hydrostatic pressure.

The above equations are derived on the assumption that the reinforcement is quite flexible relative to the compressibility of the elastomeric liner and also assuming that the elastomer pressure has decayed to a very low level.

From equation 3 it can be seen that if the difference between $D_2$ and $D_1$ is very small, that is, if it is approaching zero the value of 'Pe' can reach very high level and the rubber will extrude unless the extrusion gap is very small or zero.

If the gap is very small or zero the elastomer can be subjected to extremely high pressures, it may be 90 × 10³ p.s.i.

This statement suggests that by applying the correct internal dimensions to an end fitting the properties of the elastomer can be exploited for increasing the end fitting retention. In the end fittings of the invention, this is achieved by the shaping of the abutments 25 and depressions 26 such that there is a large differential in cross-sectional area of the elastomeric liner between the depression and the extrusion gap.

Changing the flow characteristic of elastomer in the end fitting will also reduce the axial strain, thus increasing the fatigue life.

In a conventional end fitting the space between the ferrule and insert is similar to clamping the elastomer between two flat plates.

Consider a strip of elastomer, as shown in FIG. 6, from the liner of a particular hose length $L_1$, thickness $T_1$, and width W. If this elastomer strip is compressed between two flat plates to a new dimension $L_2$, $T_2$ and W, assuming that the change in volume is very small and the width stays constant, the percentage axial strain can be written as:

$$\frac{L_2 - L_1}{L_1} \times 100 \qquad 4$$

$$W_1 L_1 T_1 = W_2 L_2 T_2 \qquad 5$$

$$\therefore L_2 = \frac{L_1 T_1}{T_2}$$

Hence $$\% \text{ Axial Strain} = \left(\frac{T_1}{T_2} - 1\right) \times 100$$

From equation 6 is can be seen that the compression of the elastomer will produce an axial strain which is similar to that of normal compression type end fittings.

In a prior art compression type end fitting this is slightly modified because of the slight convolution produced in the elastomer by the ferrule (see FIGS. 1 and 2), but from a practicable point of view the change can be ignored.

As it was mentioned before it is normally accepted practice that to increase the anchorage level of a prior art compression end fitting, if the compression level is increased on the liner, that is, the value of $T_2$ is reduced. As it can be seen from equation 6 this will lead to an increase in the axial strain, and in most cases the hose liner will tend to rupture if a further stress is imposed on the liner in question during its service life. This stress may be due to increase in temperature of the end fitting or flexing of the hose assembly.

Due to manufacturing tolerances of the hose as is laid down by the Society of Automotive Engineers or the British Standards Institution or DIN standards the compression level of the liner can very considerably after swaging, it may change from 20% to 50% at maximum dimensions of the hose liner.

It is the object of this discussion to show that with the new fitting the compression level can be improved if the elastomer flow is controlled and the deformation of the elastomer is changed geometrically.

Referring again to FIG. 5 where the original liner thickness was $t_1$, by inspection it can be said that the % strain of the rubber is approximately equal to:

$$\frac{t_2 - t_1}{t_1} \times 100 \qquad 7$$

Then it can be shown mathematically that:

$$Y_1 \propto \frac{X_1}{P/2 - X_1} \qquad 8$$

$$t_2 = t_1 + Y_1$$

$$\therefore \% \text{ elongation} = \frac{X_1}{(P/2 - X_1)} \times 100 \qquad 9$$

Equation 9 shows that % elongation of the rubber can be controlled by the value of P/2 and $X_1$ related to the thickness of the liner.

The new fitting designed such that the maximum elongation of the elastomer is between 10 and 20% when the minimum extrusion gap is achieved in the swaging operation.

The above theory assumes that the reinforcement of the hose is completely flexible. However, in practice this is not so. When the reinforcement of the hose is displaced radially the original braid or spiral angle of the layers altered when moved to a new diameter. The movement of the layers is somewhat limited by the angle they can move without the delamination of the insulation between the layers, and also by the fact that we wish to elongate the wires between each tooth of the ferrule due to the axial extension of the ferrule in the swaging operation.

If the elongation of wire is too great then there is a tendency to break the wires in the swaging operation. This results from the fact that the wires used in reinforcing hoses normally have a maximum elongation of 2% approximately, to achieve high tensile strength.

The movement of wires is influenced by the pitch of the ferrule's teeth and the depth of radial movement of the ferrules.

This can be explained as follows, with reference to FIG. 7, in which:

$P_w$ = pitch or lead of the reinforcement
$D_i$ = diameter of the reinforcement
$l$ = length of the wire
$\theta$ = braid or spiral angle From FIG. 7, the length of the reinforcement '$l$' per pitch in each layer is given by:

$$l = \sqrt{P_w^2 + \pi^2 D_i^2} \qquad 10$$

When the reinforcement is deformed to satisfy the new fittings requirements it will have to satisfy the new conditions that is to completely fill the cavity in the ferrule, the wire structure will have to follow the internal contour of the ferrule within certain limits. Basically $l$ must take up a new position, this can be achieved provided 'P' in FIG. 5 is selected to suit in change in diameter of reinforcement. The length of the parabolic arch will be satisfied by a change in $\theta$, that is the angle of the original spiralling or braiding will be altered to suit the new conditions.

From the point of view of reinforcement it can be shown that by increasing the depth of convolution, and making the angle $\phi$ steeper at the crest of the barbs of the ferrule, will reduce the shear stress between layers i.e. the insulation will suffer less. A point of inflection is formed on each side of each projection between the projection and its adjacent depressions and the angle $\phi$ is defined by the tangents at the points of inflection on each side of a projection and the longitudinal axis of the ferrule. This shear stress results from the torsional effect of the spiralling angle, the actual force causing the shear stress being a function of the separating force. In the normal compression or prior art end fitting, since the depression of the reinforcements is very small, the angle $\phi$ is very small, causing an early failure of the insulation in torsion. By selecting the correct angle of the tangent of the parabolic arch it will change the shear stress to compression stress, and it is a well known fact that the elastomer will give a much better dynamic performance in compression.

Figure 5:
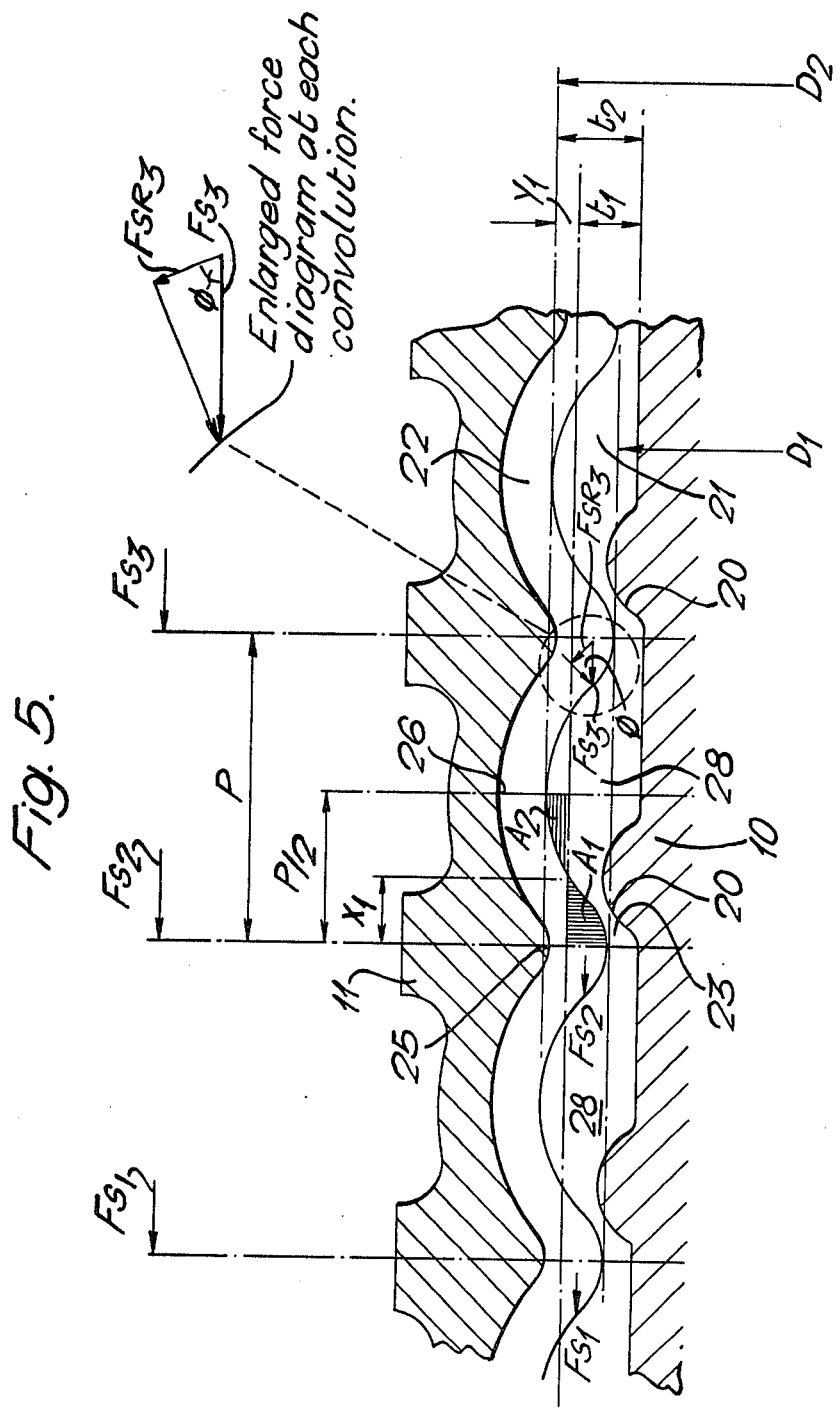
FIG. 5 is an enlarged longitudinal section through the end unit of FIG. 3.

Referring to FIG. 5, if the forces are resolved one can see that the value of $FSR_1$, $FSR_2$ and $FSR_3$ approaches zero when the value of $\phi$ tends to zero.

What this means is that the separating force on the ferrule will induce a higher stress in the insulation the greater the value of $\phi$. If $\phi$ approaches 90° then the shear force tends to zero.

In practice this means that if $\phi$ is selected correctly the shear force on the insulation can be considerably reduced. The actual forces can be resolved as shown in FIG. 8.

$$\tan \theta = FS/FH$$

$$F_H = \frac{F_s}{\tan \theta}$$

$$F_H = \frac{\pi D^2}{4} \times P_s \times \frac{1}{\tan \theta}$$

$$T = F_H \times R$$

$$\therefore T = \pi D^2 \times P_s \times \frac{1}{\tan \theta} \times R$$

$$T = 0.55 \times P_s \times D^2 \times R$$

$$F_R = \sqrt{F_s^2 + F_H^2}$$

$F_S$ = Separating force $F_H$ = Radial force $F_R$ = Resultant force $T$ = Torque tend to twist the end fitting $\theta$ = Spiral angle The physical properties of the insulation in the compression fitting will have to withstand the above mentioned forces in a multi-spiral hose.

In the new fitting this torsional effect is minimized by the fact that the forces are resolved such that the forces creating the above conditions are reduced considerably.

By selecting the angle $\phi$ in the range 70° and 90°, the actual pitch will be determined by mathematical calculations as the function or $\phi$, in order to achieve the minimum extrusional gap.

A modification of the embodiment of FIG. 3 is shown in FIG. 9. The shape of the insert 10 is modified in the region where the end of the hose end portion 16 is held in position. In FIG. 3 the rubber liner 21 extends to the end of the hose but in the modification of FIG. 9, a portion of the liner 21 is removed to leave a length 30 of reinforcement at the end of the hose without a liner. The insert of FIG. 3 is modified in FIG. 9 by adding an annular portion 31 occupying the space and having the shape of the previously deformed rubber liner 21 of the FIG. 3 embodiment.

Although a non-skived end fitting has not been discussed the same considerations apply. However, the ferrule does not have to be shaped internally to the final configuration of the reinforcement as the rubber in the cover layer will flow to fill up any spaces.

Although the hose of the specific embodiment has been described as having wire reinforcement, it will be appreciated that the invention is not restricted to reinforcement of wire but includes a suitable fibre reinforcement.

I claim:

1. A hose end unit comprising a hose end portion consisting of an inner cylindrical elastomeric liner extending to the free end of the hose end portion and a reinforcement layer surrounding the liner, and an end fitting of the kind comprising an insert to enter into the hose end portion and a ferrule to surround the hose end portion, a plurality of radially inward projections being provided on the ferrule and a plurality of radially outward projections being provided on the insert, the ferrule being swaged around the insert so that the hose end portion is gripped between the insert and the ferrule, wherein the arrangement including the shape of the projections on the ferrule being such that the reinforcement layer lies against the ferrule and the dimensions of the projections on the insert and the ferrule are such that material of the liner is confined in cells delimited by annular gaps between the reinforcement and the projections on the insert, space between the reinforcement layer and the insert in between two said gaps being completely filled by liner material under compression and the gaps being sufficiently narrow to substantially prevent flow of the material of the elastomeric liner between adjacent cells in use.

2. A hose end unit as claimed in claim 1 wherein axial spacing between adjacent insert projections is substantially the same as between adjacent ferrule projections, and wherein projections on the insert are offset from the projections on the ferrule in the longitudinal direction of the hose.

3. A hose end unit as claimed in claim 1 wherein each said gap between the reinforcement layer and projection on the insert is less than 1.5 millimeters.

4. A hose end unit as claimed in claim 1 wherein the projections on the ferrule comprise annular abutments which define annular depressions therebetween, the depressions and projections being so shaped that a first diameter to which the rubber liner is strained in the depressions is relatively large compared to a second diameter at which a separating force induced by the pressure in the hose acts, the difference between said first and said second diameters being at least 10% of the internal diameter of the hose.

5. A hose end unit as claimed in claim 4 wherein the difference between said first and second diameters is between 15% and 40% of the internal diameter of the hose.

6. A hose end unit as claimed in claim 4 in which the difference between said first and second diameters is between 20% and 30% of the internal diameter of the hose.

7. A hose end unit as claimed in claim 4 wherein the ferrule is shaped in longitudinal cross-section such that the parts of the ferrule defining the depressions are parabolic.

8. A hose end unit as claimed in claim 4 in which a point of inflection is formed on each side of each projection of the ferrule between the projection and its adjacent depressions and the angle defined by the tangents at the points of inflection on each side of a projection and the longitudinal axis is between 70° and 90°.

* * * * *